US00RE38881E

(19) United States
(12) Reissued Patent
Chubb et al.

(10) Patent Number: US RE38,881 E
(45) **Date of Reissued Patent: *Nov. 22, 2005**

(54) PLASTIC BUILDING WALL MOUNT ASSEMBLY

(75) Inventors: Norman L. Chubb, Carleton, MI (US); Richard J. MacLeod, Milford, MI (US); Charles E. Schiedegger, Metamora, MI (US)

(73) Assignee: Tapco International Corporation, Plymouth, MI (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/675,472

(22) Filed: Jul. 3, 1996

Related U.S. Patent Documents

Reissue of:
(64) Patent No.: 5,326,060
Issued: Jul. 5, 1994
Appl. No.: 07/904,384
Filed: Jun. 25, 1992

(51) Int. Cl.[7] ..... E06B 1/02; E06B 1/30
(52) U.S. Cl. ..... 248/231.9; 248/56; 248/300; 248/544; 248/906; 52/211; 52/220.8; 174/48; 220/3.6; 220/3.7
(58) Field of Search ..... 248/231.9, 27.1, 248/56, 57, 205.1, 300, 906, 220.21, 544; 220/3.5, 3.6, 3.7; 174/63, 48, 49; 52/27, 28, 211, 212, 220.8, 717.01

(56) References Cited

U.S. PATENT DOCUMENTS

| | | | | | |
|---|---|---|---|---|---|
| 1,952,719 | A | | 3/1934 | Lewin | |
| 2,022,364 | A | | 11/1935 | Walsh et al. | |
| 2,141,936 | A | | 12/1938 | Schmitt | |
| 2,167,419 | A | | 7/1939 | Heanes | |
| 2,415,602 | A | | 2/1947 | Monaco | |
| 2,997,520 | A | | 8/1961 | Kinsman | |
| 3,318,476 | A | | 5/1967 | Clark | |
| D211,950 | S | | 8/1968 | Driscoll | |
| D212,093 | S | | 8/1968 | De Smidt | |
| 3,446,467 | A | | 5/1969 | Bailey et al. | |
| 3,619,477 | A | | 11/1971 | Rasmussen | |
| 3,710,530 | A | | 1/1973 | Valtonen | |
| D238,662 | S | | 2/1976 | Black | |
| 3,953,933 | A | | 5/1976 | Goldstein | |
| D242,523 | S | | 11/1976 | Emmerling | |
| 4,098,423 | A | | 7/1978 | Marrero | |
| 4,327,841 | A | | 5/1982 | Wimberly | |
| 4,336,673 | A | | 6/1982 | Duchesne et al. | |
| 4,445,622 | A | | 5/1984 | Sideri | |
| 4,645,150 | A | | 2/1987 | Taylor | |
| 4,726,152 | A | | 2/1988 | Vagedes et al. | |
| 4,794,207 | A | | 12/1988 | Norberg et al. | |
| 4,842,155 | A | * | 6/1989 | Begin, Jr. | 220/3.7 X |
| 4,875,318 | A | | 10/1989 | MacLeod et al. | |
| 4,920,708 | A | | 5/1990 | MacLeod et al. | |
| 5,035,646 | A | | 7/1991 | Ehrenfels et al. | |
| 5,133,165 | A | * | 7/1992 | Wimberly | 52/220.8 |
| 5,397,093 | A | * | 3/1995 | Chubb et al. | 52/28 X |
| 5,577,702 | A | * | 11/1996 | Chubb et al. | 52/28 X |

* cited by examiner

*Primary Examiner*—Clark F. Dexter
(74) *Attorney, Agent, or Firm*—Howard & Howard

(57) ABSTRACT

A plastic building wall mounting bracket assembly comprises a one-piece mounting bracket with a back wall and an integral continuous peripheral wall extending axially therefrom, a flange member having an outside flange and an integral flange wall extending axially therefrom to be received by the mounting bracket so that only the flange member is visible from outside the building.

15 Claims, 2 Drawing Sheets

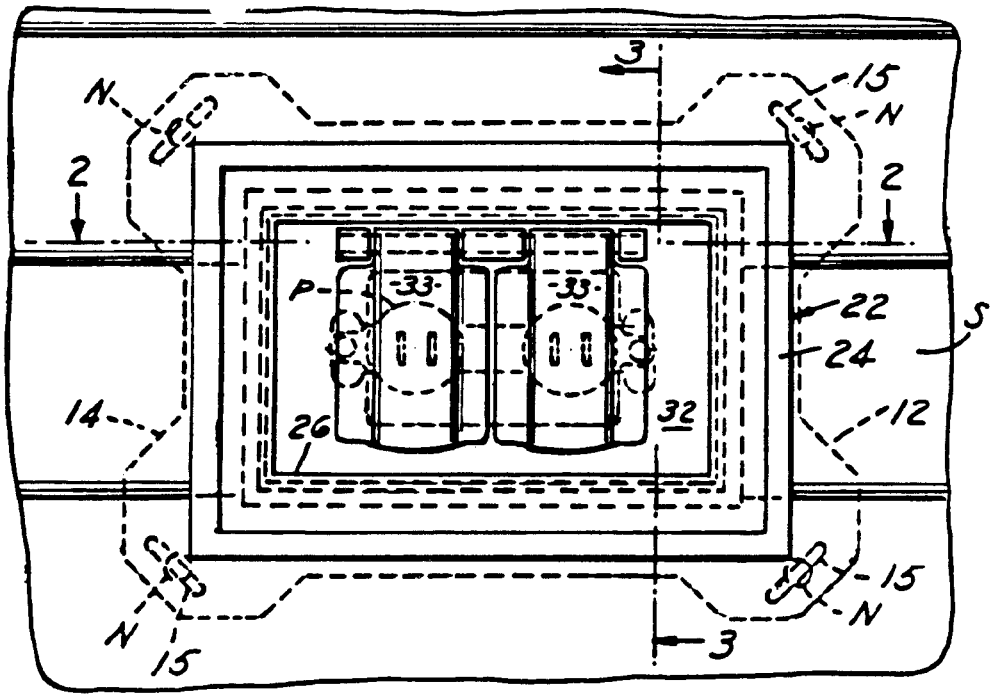
FIG.1
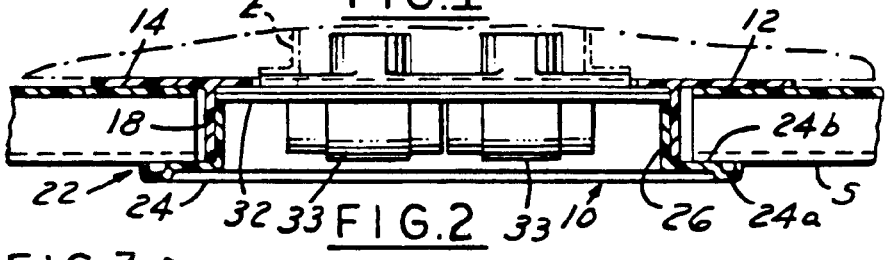
FIG.2
FIG.3
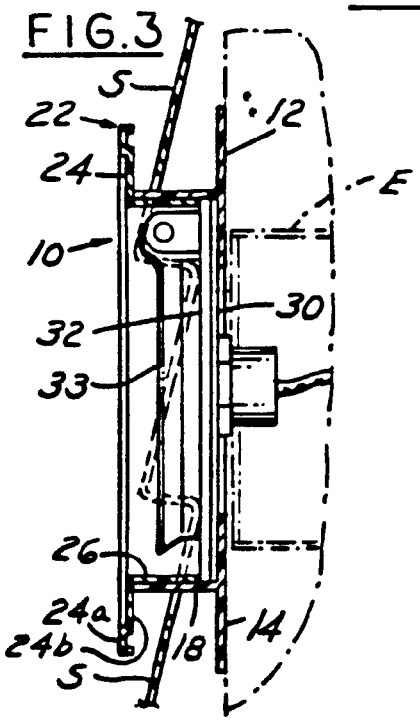
FIG.4
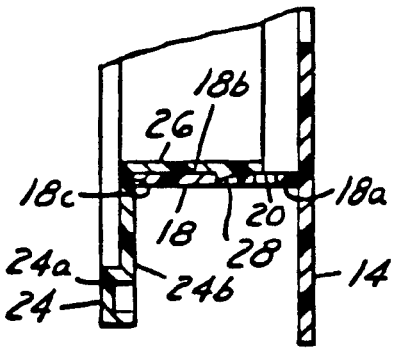

12
16
18a
15
18c
14
20
18
18b
P
22
33
26
33
30
O
S
32
24

35
34
36
12
18a
15
18
20
20
16
18b
18c
15
15

22
14
18c
18a 26
18b
22
22
F
26
35
34
28
18c
12
24

PLASTIC BUILDING WALL MOUNT ASSEMBLY

Matter enclosed in heavy brackets [ ] appears in the original patent but forms no part of this reissue specification; matter printed in italics indicates the additions made by reissue.

This invention relates to a plastic building wall mount for attachment to the wall of a building which has siding thereon and is adapted for mounted elements such as electrical boxes, faucets and the like.

BACKGROUND AND SUMMARY OF THE INVENTION

It has been known to use wall mounting brackets for attachment on the wall of a building having siding and is adaptable for mounting various devices. Such a bracket is disclosed in U.S. Pat. No. 4,920,708 which provides for a one-piece body with a front wall and an integral peripheral wall extending therefrom with an integral peripheral flange which attaches to the wall of a building. A flange member with an axial wall is telescoped over the peripheral wall of the body and is locked into position by interengaging projections and recesses on the axial wall of the flange and the peripheral wall of the body. One of the problems with respect to such a bracket, especially when adapted for use with an electrical box, is that the front wall of the body prevents convenient access to the electrical box.

In addition, both the front wall of the mounting bracket and the flange member are visible making color coordination with the siding more difficult and costly.

Another plastic building product is disclosed in U.S. Pat. No. 4,875,318 that is adapted to be placed on a wall of a building to provide a louver or window and is able to accommodate siding of varying thickness. However, this device poses the same problem in that both the body and the flange member are visible requiring both parts to be made of the same costly material and color in order to blend with the siding on the house.

In U.S. Pat. No. 4,726,152, a bracket is disclosed for mounting a fixture. This device is not easily adapted for use with an electrical box, faucets and similar fixtures. The spacing of the outer wall of the outer cap prohibits access to the fixture or would require the fixture to be extended incurring much labor and expense.

In accordance with the present invention, a plastic building wall mounting bracket is adapted particularly for use with an electric box or a faucet.

Specifically, in accordance with the present invention, the plastic building wall mounting bracket assembly comprises a one-piece plastic body with an integral peripheral wall extending from a back wall which is to be mounted to the wall of a house, and a flange member with an integral peripheral wall adjacent the inner periphery thereof for attachment to the wall of the bracket member. In use, only the flange member is visible thus allowing the bracket member to be made of a less expensive material, of a different color such that color coordination with the siding is easier and less costly or of a U.L. approved material.

Also, the invention may be used with existing short wires and electric boxes thus eliminating the need for any extension thereof.

In addition, the plastic building wall mounting bracket assembly is also adapted to be used with a faucet and in such use, an alternate piece is provided to be inserted over the faucet pipe to obscure the hole in the wall through which the pipe extends and which also may be color coordinated with the outside flange member to be the same color as the siding of the house.

DESCRIPTION OF THE DRAWINGS

FIG. 1 is a front view of the plastic building wall mounting assembly.

FIG. 2 is a sectional view taken along line 2—2 in FIG. 1.

FIG. 3 is a sectional view taken along line 3—3 in FIG. 1.

FIG. 4 is an enlarged fragmentary sectional view showing the locator lock.

DESCRIPTION

Figures 5, 6, 7, 8, 9:
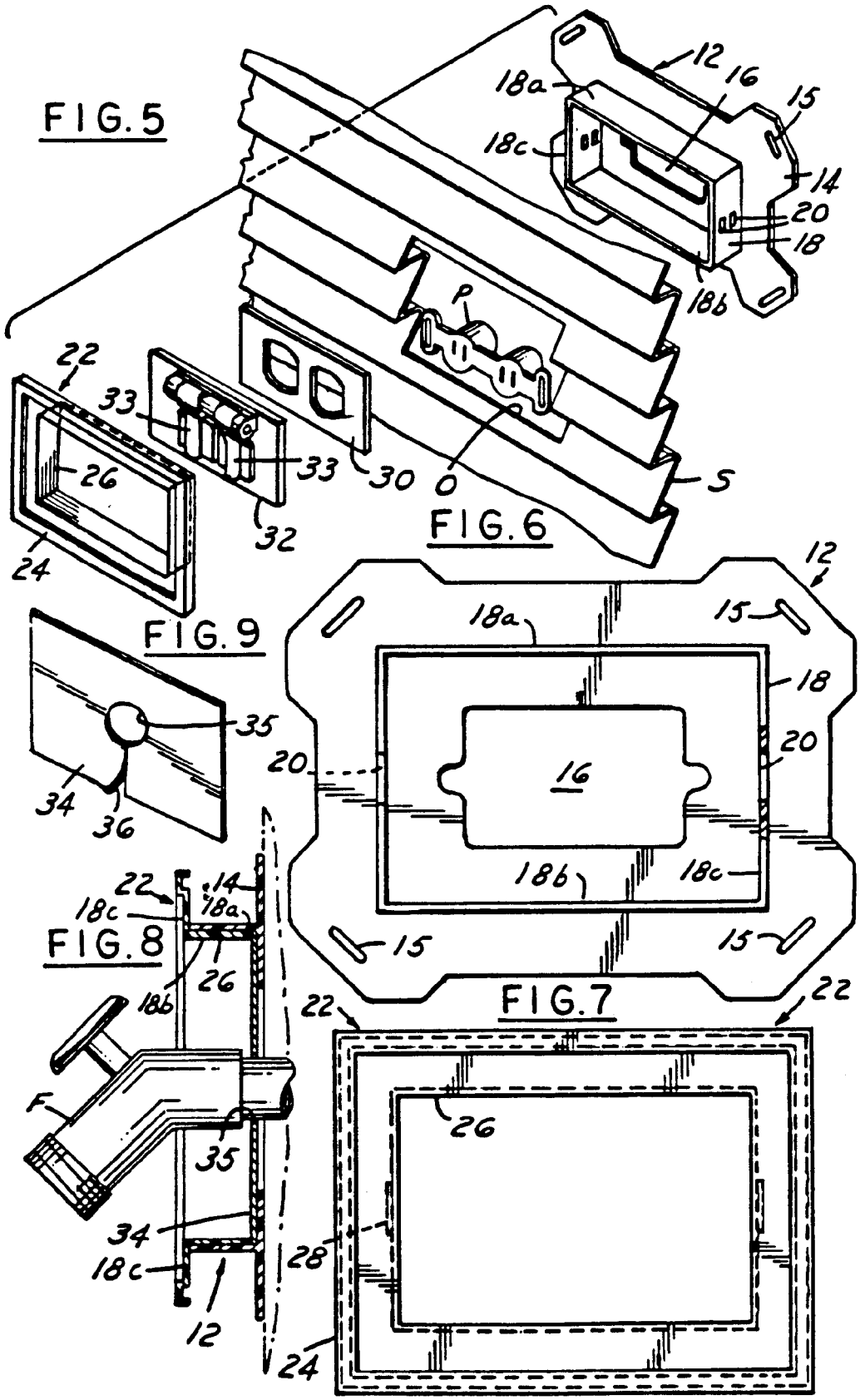
FIG. 5 is an exploded perspective view of the plastic building wall mounting bracket assembly with siding.
FIG. 6 is a front view of the mounting bracket.
FIG. 7 is a front view of the flange member.
FIG. 8 is a cross sectional view of a modified form of the plastic building wall mounting bracket assembly.
FIG. 9 is a perspective view of an inside cover piece.

Referring to the figures, and more particularly to FIGS. 1–3, the wall mounting bracket assembly of the present invention is shown mounted to a wall of a house having siding S and which supports a device, for example, an electrical box E. The assembly 10 includes a mounting bracket 12 (FIG. 6) and a flange member 22 (FIG. 7), each comprising a one piece plastic body such as polypropylene. The mounting bracket 12 has a back wall 14 adapted to be mounted to the wall of a house. The back wall 14 has a central opening 16 to accommodate, for example, an electrical box housing a standard two-plug outlet P. An integral peripheral wall 18 extends at an axial direction from the back wall 14 and is adapted to extend through an opening O in the siding S as seen most clearly in FIG. 5. The peripheral wall 18 has an outer surface 18a, an inner surface 18b and a free edge 18c. The back wall 14 is adapted to be mounted to the wall of a building by fasteners such as nail (FIG. 1) extending through elongated slots 15 in the back wall 14. The assembly 10 further comprises a flange member 22 (FIG. 7) which includes an outside flange 24 and an integral flange wall 26 extending axially from the periphery, thereof. The outside flange 24 has an outer surface 24a and an inner surface 24b. The flange wall 26 is adapted to be telescoped within the peripheral wall 18 so that the free edge 18c of the peripheral wall 18 is covered by and remains hidden from view behind the outside flange 24. Also, the outer surface 24a covers the inner surface 18b of the peripheral wall 18. The peripheral wall 18 includes a plurality of spaced recesses 20 which selectively receive teeth or locator locks 28 on the flange wall 26 (FIG. 4).

In use, the mounting bracket 12 is fastened to the wall of a house as before mentioned and siding S is then applied closely, adjacent the wall. After the electrical box E has been mounted an insulator 30 is placed within the peripheral wall 18 closely adjacent to the electrical box and a cover piece, which is a plastic socket cover 32 with hinged covers 33, is received within peripheral wall 18 to be adjacent insulator 30. Flange member 22 is then telescopically connected to the mounting bracket 12 such that only the flange member 22 and the socket cover 32 are seen (FIG. 1).

The embodiment of FIGS. 8 and 9 is adapted for use in mounting a faucet F. An inside cover piece 34 has a central opening 35 and a slit 36 extending from the opening 35 to an outside edge to facilitate insertion over the faucet pipe and is placed adjacent the back wall 14 of the mounting bracket 12. Flange member 22 is then telescopically received inside the peripheral wall 18 as described before such that only the inside cover piece and the flange member 22 are visible and which may be made of the same material and/or color to blend with the siding S.

Openings 20 in the peripheral wall 18 are spaced such that the locator lock 28 is received in the opening nearest the back wall 14 when the assembly is used with a faucet as in FIG. 8 and where the locator lock 28 is received in the other opening when in use with an electrical box.

What is claimed is:

1. A plastic building wall mounting bracket assembly comprising a one-piece mounting bracket having a back wall with a central opening and an integral continuous peripheral wall extending substantially orthogonally from said back wall, a portion of said back wall extending outwardly past the peripheral wall such that the back wall may be fastened to a wall of a building with siding applied thereafter over the bracket, said siding having an opening formed by edges and the peripheral wall of the bracket extending through the opening in the siding such that the edges of the siding are placed closely adjacent the peripheral wall, said peripheral wall having an outer surface, an inner surface and a free edge, a flange member having an outside flange and an integral flange wall extending substantially orthogonally from an inside periphery of the outside flange, said flange wall having an outer surface and an inner surface, wherein the flange member is telescopically received within said one piece mounting bracket such that said outer surface of said flange wall is positioned adjacent said inner surface of said peripheral wall, and the outside flange covers the free edge of the peripheral wall and the inner surface of said peripheral wall of said mounting bracket so that only said flange member is visible from outside the building, a cover piece received within the flange wall of said flange member, said cover piece being interposed between said flange wall of said flange member and said back wall of said bracket, interengaging means on said inner surface of said peripheral wall of said mounting bracket and said outer surface of said flange wall of said flange member for securing the flange wall of said flange member to said peripheral wall of said mounting bracket at one of a plurality of predetermined positions with respect to the back wall of said mounting bracket.

2. The plastic building wall mounting bracket assembly set forth in claim 1, comprising said cover piece having a central opening with a slit extending from the opening to an edge of the cover piece and to fit over a pipe or faucet.

3. The plastic building wall mounting bracket assembly as set forth in claim 1, wherein the cover piece is a plastic socket cover for covering a socket of an electrical box, said socket cover including a plurality of socket openings.

4. The plastic wall mounting bracket assembly set forth in claim 3 wherein said plastic socket cover includes hinged covers covering said socket openings.

*5. A plastic wall mounting bracket assembly, said wall mounting bracket assembly comprising:*

*a mounting bracket including a back wall with a central opening, said back wall including securing means for securing said back wall to a wall of a building with independent fastening elements so that the back wall will rest generally flush against said building wall, and said mounting bracket further including a substantially continuous peripheral wall integrally formed with said back wall and extending substantially orthogonally from said back wall to a free end, said free end defining an opening, a first portion of said back wall extending outwardly of said peripheral wall and a second portion of said back wall extending inwardly of said peripheral wall, said first and second portions extending generally in common plane, whereby when said back wall is secured to said wall of said building, siding can be secured to said wall of said building to at least partially extend over said first portion of said back wall;*

*a flange member secured to said mounting bracket, said flange member having an outside flange forming a central opening and an integral flange wall integrally formed with said outside flange and extending substantially orthogonally from said outside flange, said flange wall having inner and outer surfaces with at least one of said surfaces having a first attaching portion having an engaging mechanism, said peripheral wall of said mounting bracket further including a second attaching portion having an engaging mechanism, said first attaching portion and said second attaching portion interengaging with each other via the respective engaging mechanism to releasably secure said flange member to said mounting bracket at one of a plurality of positions relative to said mounting bracket without the need for independent fastening elements;*

*said central opening of said flange member permitting insertion of an external cover member through said central opening of said flange member such that said external cover member may be disposed within an area bounded by said flange wall of said flange member; and*

*a cover piece disposed within the flange wall of said flange member.*

*6. The assembly of claim 5, wherein:*

*said engaging mechanism of said first attaching portion comprises a projecting tooth; and*

*said engaging mechanism of said second attaching portion is positioned on said peripheral wall such that said projecting tooth engages within said engaging mechanism of said second attaching portion.*

*7. The assembly of claims 6, wherein said engaging mechanism of said second attaching portion comprises at least two spaced apart openings, a first one of said at least two openings being positioned to interengage with said projecting tooth to hold said flange member to said mounting bracket at a first distance from said back wall, and*

*a second one of said at least two openings being positioned closer to said back wall than said first one of said at least two openings to interengage said projecting tooth to hold said flange member at a second distance from said back wall which is closer to said back wall than said first distance when said flange member is urged into a second secured position relative to said mounting bracket.*

*8. The assembly of claim 7, wherein said outside flange overlaps a portion of said back wall when said flange member is secured to said mounting bracket.*

*9. The assembly of claim 8, wherein said flange wall telescopically engages with said peripheral flange.*

*10. A plastic wall mounting bracket assembly, said bracket assembly comprising:*

*a mounting bracket having a back wall and a peripheral flange substantially continuous with and integrally formed with said back wall, and extending substantially orthogonally from said back wall to a free edge, said free edge defining an opening, a first portion of said back wall extending outwardly of said peripheral flange and a second portion of said back wall extending inwardly of said peripheral flange, said peripheral flange having at least one attaching portion and said back wall having an opening for permitting at least a neck portion of a faucet to extend therethrough and said back wall having securing means for securing said back wall to a wall of a building with independent fastening members;*

*a flange member having an outside flange and a generally rectangular peripheral wall extending orthogonally from said outside flange, said outside flange forming a generally rectangular central opening, said peripheral wall further including a projecting tooth interengaging with one of said at least one attaching portion of said peripheral flange;*

*said outside flange of said flange member at least partially overlapping said first portion of said back wall of said mounting bracket; and*

*a cover piece received within the flange wall of said flange member.*

*11. A plastic wall mounting bracket assembly, said bracket assembly comprising:*

*a mounting, bracket having a back wall and a peripheral flange substantially continuous with and integrally formed with said back wall, and extending substantially orthogonally from said back wall to a free edge, said free edge defining an opening, a first portion of said back wall extending outwardly of said peripheral flange and a second portion of said back wall extending inwardly of said peripheral flange, said peripheral flange having at least one attaching portion and said back wall having an opening, for permitting at least a neck portion of a faucet to extend therethrough, and said back wall having securing means for securing said back wall to a wall of a building with independent fastening members;*

*a flange member having an outside flange and a generally rectangular peripheral wall extending orthogonally from said outside flange, said outside flange forming a generally rectangular central opening, said peripheral wall further including a projecting tooth interengaging with one of said at least one attaching portion of said peripheral flange, said outside flange of said flange member at least partially overlapping said first portion of said back wall of said mounting bracket; and*

*a cover portion inserted within said peripheral flange to cover a portion of said back wall, said cover portion having an opening for permitting a neck of a faucet to extend therethrough.*

*12. The bracket assembly of claim 11, wherein said cover portion comprises an independent planar cover member having a slit extending from said opening thereof to one edge portion of said cover portion, and inserted within said peripheral wall flush against a portion of said back wall to allow said neck portion of said faucet to protrude through said opening of said cover portion.*

*13. A plastic wall mounting bracket assembly, said bracket assembly comprising:*

*a mounting bracket having a back wall and a peripheral wall substantially continuous with and integrally formed with said back wall, and extending substantially orthogonally from said back watt to a free end, said free end defining an opening, a first portion of said back wall extending outwardly of said peripheral wall and a second portion of said back wall extending inwardly of said peripheral wall, said peripheral wail having at least one attaching portion and said back wall having an opening for permitting at least a portion of an electrical receptacle to extend therethrough, said back wall having means for being fixedly secured to a wall of a building with independent fastening members;*

*a flange member secured to said mounting bracket, said flange member having an outside flange and a generally rectangular flange wall extending orthogonally from said outside flange, said flange member forming a generally rectangular central opening, said flange wall including a projecting tooth portion interengaging with one of said at least one attaching portion of said peripheral wall of said mounting bracket; and*

*said outside flange of said flange member extending over at least a portion of said back wall of said mounting bracket; and*

*a cover piece received within the flange wall of said flange member.*

*14. A plastic wall mounting bracket assembly, said bracket assembly comprising:*

*a mounting bracket having a back wall and a peripheral wall substantially continuous with and integrally formed with said back wall, and extending substantially orthogonally from said back watt to a free end, said free end defining an opening, a first portion of said back wall extending outwardly of said peripheral wall and a second portion of said back wall extending inwardly of said peripheral wall, said peripheral wall having at least one attaching portion and said back wall having an opening for permitting at least a portion of an electrical receptacle to extend therethrough, said back wall having means for being fixedly secured to a wall of a building with independent fastening members;*

*a flange member secured to said mounting bracket, said flange member having an outside flange and a generally rectangular flange wall extending orthogonally from said outside flange, said flange member forming a generally rectangular central opening, said flange wall including a projecting tooth portion interengaging with one of said at least one attaching portion of said peripheral wall of said mounting bracket, said outside flange of said flange member extending over at least a portion of said back wall of said mounting bracket; and*

*a cover portion inserted within said peripheral wall of said mounting bracket for partially covering said electrical receptacle.*

*15. The bracket assembly of claim 14, wherein said cover portion comprises an electrical receptacle cover member inserted within said peripheral wall of said mounting bracket.*

* * * * *

UNITED STATES PATENT AND TRADEMARK OFFICE

CERTIFICATE OF CORRECTION

PATENT NO. : RE 38,881 E 
DATED : November 22, 2005
INVENTOR(S) : Charles R. Schiedegger, Norman L. Chubb and Richard J. MacLeod It is certified that error appears in the above-identified patent and that said Letters Patent is hereby corrected as shown below:

Column 3,
Line 28, should read -- an inner surface, and a free edge. --.
Line 34, should read -- within said one-piece mounting bracket such that said --.
Line 59, should read -- 3. The plastic building wall mounting bracket assembly set forth in claim 1 --.

Column 4,
Line 14, should read -- in a common plane,… --.
Line 49, should read -- The asembly of claim 6,… --.

Column 5,
Line 13, should read -- extend therethrough, and said… --.
Line 32, should read -- a mounting bracket havnig a back wall… --.
Line 41, should read --an opening for permitting… --.

Column 6,
Lines 6 and 37, should read -- back wall… --.
Line 11, should read -- peripheral wall --.

Signed and Sealed this

Fourteenth Day of March, 2006

JON W. DUDAS
*Director of the United States Patent and Trademark Office*